United States Patent [19]

Morser et al.

[11] 4,302,711

[45] Nov. 24, 1981

[54] DC SERVOMOTOR CIRCUIT HAVING DRIVE CURRENT CONTROLLED AS A FUNCTION OF MOTOR SPEED

[76] Inventors: Alfred H. Morser, 23 Whitehorn La., Letchworth, England, SG6,2DN; Paul Szekely, 35 Hare Crescent, Watford, England

[21] Appl. No.: 14,980

[22] Filed: Feb. 26, 1979

Related U.S. Application Data

[63] Continuation of Ser. No. 834,844, Sep. 20, 1977, abandoned.

[51] Int. Cl.$^3$ .............................................. H02P 5/16
[52] U.S. Cl. .................................... 318/327; 318/398; 318/447
[58] Field of Search ............... 318/327, 447, 611, 624, 318/678, 398, 328, 326, 434, 308

[56] References Cited

U.S. PATENT DOCUMENTS

| | | | |
|---|---|---|---|
| 3,179,865 | 4/1965 | Carton | 318/28 |
| 3,293,522 | 12/1966 | Lewis | 318/327 |
| 3,450,973 | 6/1969 | Toby | 318/327 |
| 3,508,132 | 4/1970 | Peterson | 318/308 |
| 3,548,278 | 12/1970 | Soyameria | 318/257 |
| 3,649,897 | 3/1972 | Messick | 318/308 |
| 3,735,225 | 5/1973 | Raatz | 318/332 |
| 3,812,409 | 5/1974 | Dinger | 318/310 |

*Primary Examiner*—David Smith, Jr.

[57] ABSTRACT

A drive circuit is provided for controlling the energization of a DC motor as a function of speed to maintain the motor speed equal to a speed defined by a speed command signal. The speed command signal is summed with a velocity feedback signal to produce a speed error signal which is used as an input to a motor drive circuit. In accordance with the invention, the speed error signal is limited in order to continuously limit the current through the motor to a continuously changing maximum depending on the speed of the motor. During an initial part of the speed range, the limiting level is increased to maintain a constant maximum motor current. During an intermediate speed range, the limiting level decreases so as to sharply decrease current with increasing motor speed; and during a final speed range, the limiting level increases so as to gradually decrease current with increasing motor speed.

6 Claims, 5 Drawing Figures

DC SERVOMOTOR CIRCUIT HAVING DRIVE CURRENT CONTROLLED AS A FUNCTION OF MOTOR SPEED

This is a continuation of application Ser. No. 834,844, filed Sept. 20, 1977, now abandoned.

BACKGROUND OF THE INVENTION

The invention relates generally to the area of DC servomotor control circuits, and specifically the invention provides a circuit for controlling the motor current as a function of a speed error signal.

In DC servomotor circuits, as are used for example in numerically controlled machine tools, it is known that the motor current must be limited in order to avoid damaging effects. If too high a current is commutated, the life of the commutator will be shortened; and the value of the current which can safely be commutated falls with increasing motor speed. Furthermore, permanent magnet DC motors are subject to an overriding current limit above which irreversible partial demagnetization of the field magnets occurs leading to a loss of torque.

Although not limited specifically to such a situation, the invention will largely be described in the context of energization by controlled rectified AC wherein mean currents are increased and decreased by respectively lengthening and shortening the proportion of a half cycle over which conduction occurs. The invention is equally applicable to other ways of controlling the energization of a DC motor. In controlled rectifier systems, the phase angle at which conduction commences may be referred to as the firing angle. Advancing and retarding this angle respectively increases and decreases the energization. The invention applies equally to the conditions of acceleration and deceleration of a maximum load at any speed.

A DC servomotor circuit may include a speed loop with a comparator which compares a speed command signal with an actual speed command signal to produce a speed error signal. This error signal is used to directly control the firing angle. Alternatively, the speed loop may be followed by a current loop with a second comparator which compares the speed error (acting as a current command signal) with an actual current signal to produce a current error signal. This signal then controls the firing angle.

It is known to use a parallel acting limit circuit which limits the speed error signal and retards the firing angle when the current exceeds a set limit. The main problem with this type of circuit is that when the motor is accelerating the current limit is always temporarily exceeded while the limit circuit is responding to and counteracting this situation.

We have previously developed a system of a current limiting servomotor circuit with a speed loop and a current loop. The speed error signal is subject to a limit which has a first fixed level up to a certain speed and thereafter has a second and smaller fixed level. The provision of two fixed limiting levels corresponding to two speed ranges gives improved current limitation. It satisfies reasonably well the requirement for a lower limit at higher speeds because of the limit on which current can be commutated. Also, because the limit is imposed on the current which can be commanded within each of the two speed ranges, the current limit is not influenced by speed. This relies upon the use of a current loop as well as a speed loop. In practice, when energizing the motor by controlled rectified alternating current, a current loop creates severe design problems because the command signal (speed error signal) is a smooth slowly varying signal whereas the actual current signal, as sensed by current shunt in the motor circuit, is discontinuous and must be smoothed by an RC filter network. In a single phase system, the response to a command signal may be delayed by up to 10 milliseconds. The design of a filter network which provides the necessary smoothing but does not introduce further delays into the system is extremely difficult.

The invention provides a DC motor control circuit which is free of the above disadvantages. The drive circuit is arranged to control the energization of the motor as a function of a speed error signal thereby maintaining the motor speed at the speed commanded by the speed command signal. A limiting device is responsive to the actual motor speed to limit the level of the speed error signal according to different functions depending on the speed range of the motor.

In the prior art devices, a constant limit was used in each of the speed ranges. However, a constant limit on firing angle gives a falling limit on current. Accordingly, in the present invention, the limit in the various speed ranges increases or decreases according to the motor requirements. The limiting level is rendered dependent on measured speed, and the way in which the limit is imposed is dependent upon the details of a particular servomotor circuit. The limit may be bipolar or unipolar. The unipolar limit function or each bipolar limit function can be built up as a function of the speed signal from linear segments with slopes and break points determined in the known manner. Slopes in general are determined by gain factors; and break points may be determined by amplifier cutoffs, diode action or saturation of transistors. The limit may be imposed on the speed error signal by techniques known per se involving diodes or switching transistors.

SUMMARY OF THE INVENTION

According to one embodiment of the invention, a direct current servomotor circuit is comprised of a DC motor connected to drive a device providing an actual speed signal representative of motor speed. A comparator is responsive to a speed command signal and to the actual speed signal to provide a speed error signal. A drive circuit is arranged to control the energization of the motor in dependence upon the speed error signal so as to maintain the motor speed at the speed commanded by the speed command signal. A limiting circuit is arranged to limit the magnitude of the speed error signal to a limiting level. The limiting circuit comprises means responsive to the actual speed signal for varying the limiting level continuously as a function of motor speed.

DESCRIPTION OF THE PREFERRED EMBODIMENT

Figure 1:
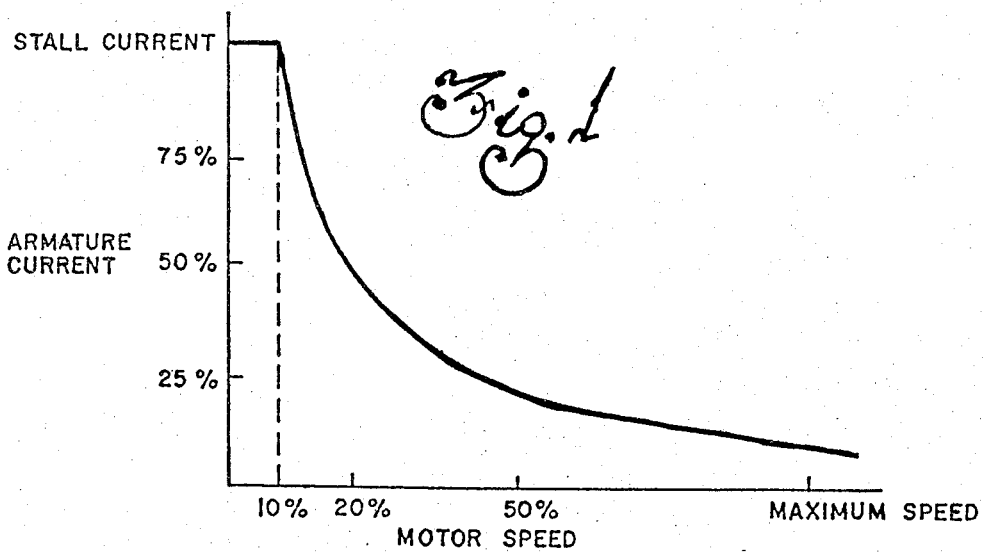
FIG. 1 shows a typical curve of the limit on armature current as a function of speed.

In FIG. 1 the permitted armature current is plotted as a percentage of the stall current against speed expressed as a percentage of maximum speed. Over the first 10% of the speed range, the current should be limited to the constant value of the stall current. This is an overriding limit imposed by the need to avoid risk of demagnetization. Thereafter, the limit falls generally exponentially toward a value of 10% of the stall current at the maximum motor speed.

Figure 2:
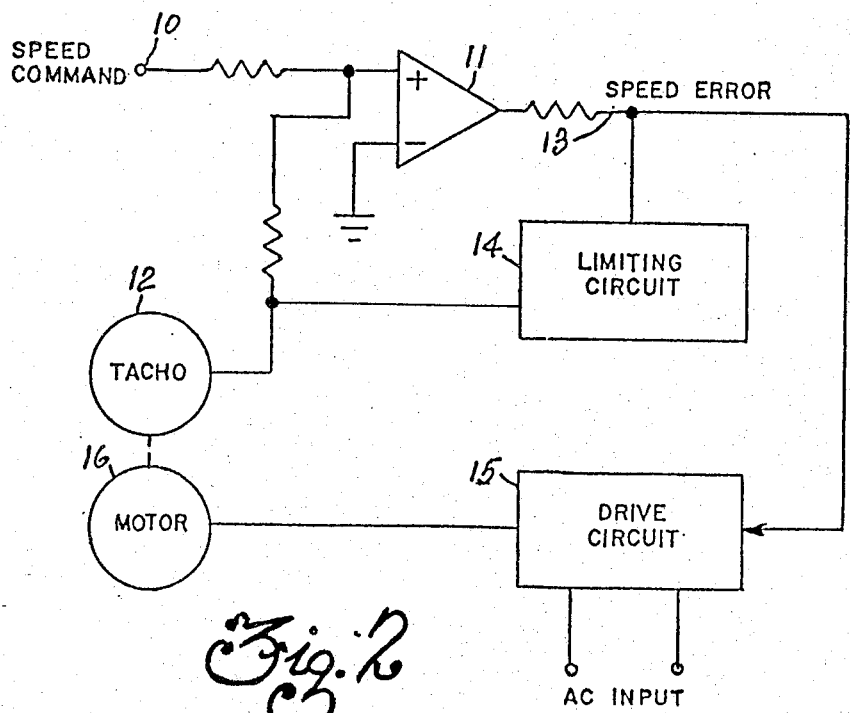
FIG. 2 shows a DC servomotor circuit.

FIG. 2 shows a DC servomotor circuit in which a speed command signal, for example from a numerical control system, is applied to a terminal 10 connected to an input of a summing operational amplifier 11. A tachometer 12 provides an actual speed signal whose magnitude and polarity represent respectively motor speed and direction. This signal is also applied to the amplifier 11 where it is compared with the command speed signal. The output of the amplifier 11 is a speed error signal on line 13.

Figure 4:
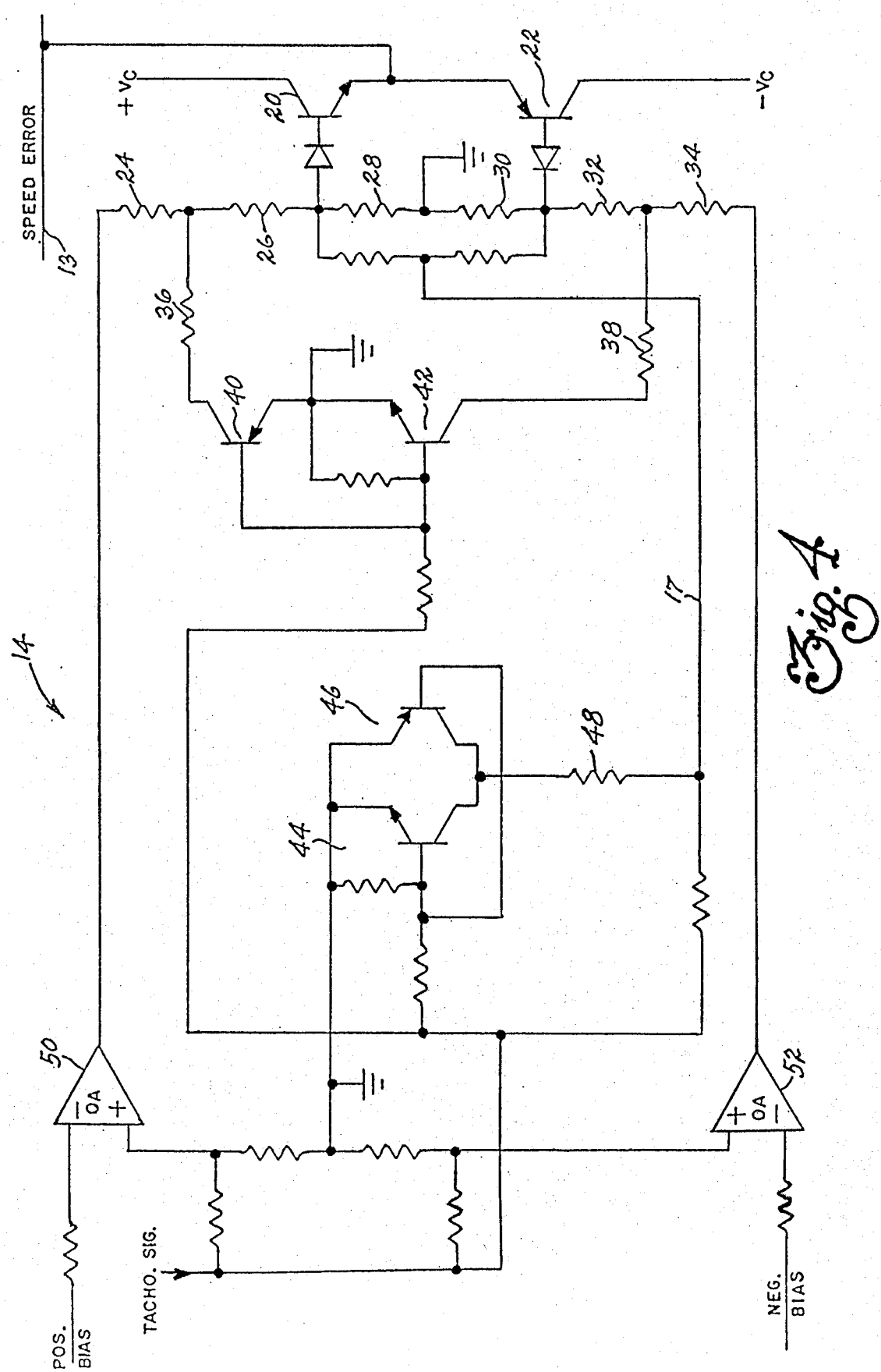
FIG. 4 is a circuit diagram of a circuit for producing a limiting level in accordance with FIG. 3.

The speed error signal is limited by a limiting circuit 14 shown in detail in FIG. 4 which directly determines the firing angle of a controlled rectifier drive circuit 15 (FIG. 2) of known nature, e.g., a drive circuit which controls the conduction angle of a thyristor to provide the DC motor current. The control of conduction angle is well-known and may involve comparison of a speed command signal with a sawtooth waveform in order to produce trigger pulses at a variable time which in turn determines the conduction angle. The drive circuit is not illustrated in detail since it does not form any part of the invention, and further any conventional drive circuit may be employed. The drive circuit 15 energizes the armature of the permanent magnet DC motor 16 which drives the load (not shown) and the tachometer 12.

Figure 3:
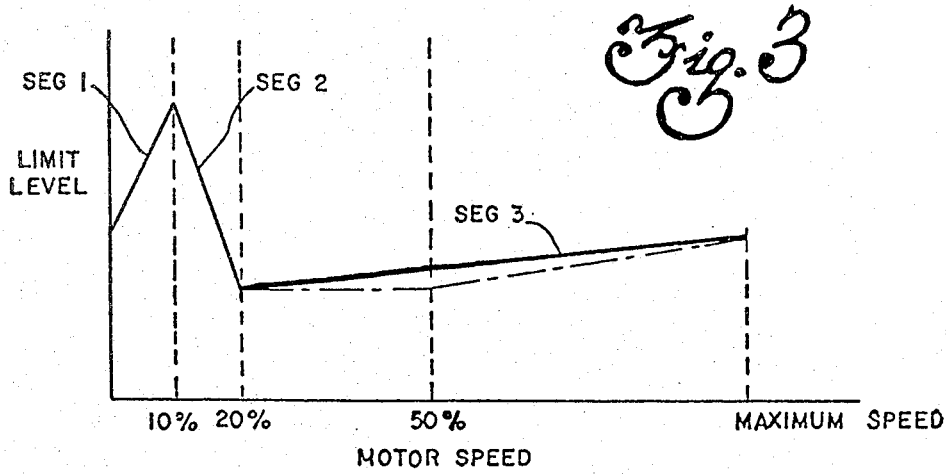
FIG. 3 shows a curve of a limiting level versus speed.

The limiting circuit 14 provides a programmed limitation on the speed error signal versus speed as illustrated in FIG. 3. In the speed range of 0 to 10%, the current limit is to be constant (FIG. 1). However, a constant limit on the speed error signal would not achieve this result because the speed error signal determines the firing angle and hence the mean DC energization $V_e$. It is well-known that $V_e = V_b + IR$, where $V_b$ is the back EMF of the motor and R is the armature resistance. Also, $V_b = KS$ where K is a constant; and if $V_e$ is to be subject to a constant current limit, the armature current I should be forced to drop as speed is increased. To avoid this, the limit as illustrated in FIG. 3 is arranged to increase over the speed range of 0 to 10%. This is defined as segment 1.

As illustrated in FIG. 1, in the speed range of from 10% to 20%, the permitted armature current falls very drastically to 45% of the stall current. Therefore, as illustrated by segment 2 of FIG. 3, the limit level is reduced correspondingly. Referring again to FIG. 1, in the speed range of from 20% to 50%, the permitted current falls another 35%. The mean slope in this range is thus approximately minus one, and the limit level should (in accordance with the equation $V_e$ equals KS plus IR) stay approximately constant over this range as shown by the broken lines in FIG. 3. Again, as shown in FIG. 1, above the 50% speed range, the current can rise very gradually. In accordance with the present invention, the limit level over the 20% speed range is approximated by the line segment 3 illustrated in FIG. 3. This is a reasonable straight line approximation of the required curve, however, any other approximations would be suitable. In FIG. 3, the illustrated limit level characteristic is advantageous in that it is comprised only of three straight line segments. The curve has furthermore only been discussed qualitatively. The actual values can be worked out for any given motor on the basis of available data (the required I versus S curve, armature resistence, etc.) and the values can also be adjusted imperically on the basis of test measurements.

Turning now to FIG. 4, since the limiting function is bipolar, the basic limiting function is performed by the clamping action of a pair of transistors 20 and 22 with their bases connected in a chain of bias resistors 24 to 34 and to a line 17 which determines the base drive. The speed error signal on line 13 is limited in the positive sense by conduction of 22 and in the negative sense by conduction of 20. The following table shows the signal polarities under conditions both of acceleration and drive and of deceleration and braking.

|  | COMD | TACH | SPEED ERROR | OPERATIVE LIMITER |
|---|---|---|---|---|
| ACC & DRIVE | + | − | − | 20 |
| DEC & BRAKE | − | + | + | 22 |
|  | + | + | − | 20 |
|  | − | − | + | 22 |

Segment 1 of FIG. 3 is established by the application of the tachometer signal to the line 17. Assume, for example, a positive drive command. The table shows that the tachometer and speed error signals are negative, and the speed error signal therefore is limited by transistor 20. As the negative tachometer signal increases in magnitude, the signal on line 17 tends to hold transistor 20 off more strongly, and so the limiting level increases.

Segment 2 is established by connecting resistors 36 and 38 in shunt with part of the voltage divider resistor 24 through 34. This reduces the base bias level as transistors 40 and 42 connected between the resistors begin to conduct. These transistors are driven by the tachometer signal and are so biased that they start to conduct when the speed equals approximately 10% of its maximum. The transistors are fully conductive when the speed reaches 20% of its maximum value.

Transistors 44 and 46 are also driven by the tachometer signal and provide a bipolar shunt path to ground on the line 17 by means of a common collector resistor 48. Transistors 44 and 46 start to switch on together with transistors 40 and 42; and when fully conductive, transistors 44 and 46 tend to restrict any further increase in the signal on line 17. Thus, when the speed reaches its 20% value and the segment 3 is entered, transistors 40 and 42 have become fully conductive and can no longer lower the bias. At this point, the drive effect of the signal on line 17 resumes but with a much reduced rate of increase compared with segment 1. This reduced rate being determined by the collector resistor 48 of transistors 44 and 46 providing a controlled shunt path.

During deceleration, the motor acts as a generator driving current through the thyristors or other controlled rectifiers in the circuit 15 back to the main power supply. The magnitude of this current in a given system is a function of the generated voltage and firing angle. If the motor is to be braked, the firing angle should be initially retarded thereby allowing some current to be delivered by the generator-motor 16. As the motor loses speed and the generated voltage drops, the firing angle can be advanced. The combined effect of the reducing generated voltage and the advancing firing angle can either be a constant or an increasing brake current depending upon the relative strengths of the two actions.

Referring back to the table of signal polarities, it can be seen that if positive and negative tachometer signals are used to decrease the bias on transistors 20 and 22 respectively, the required action can be achieved without interfering with the operation under deceleration or drive conditions. For example, during positive drive, any limiting in accordance with FIG. 3 is performed by transistor 20. If the bias on transistor 22 is reduced in dependence on the negative tachometer voltage, the circuit will be ready to limit the firing angle when conditions switch to deceleration or braking.

Figure 5:
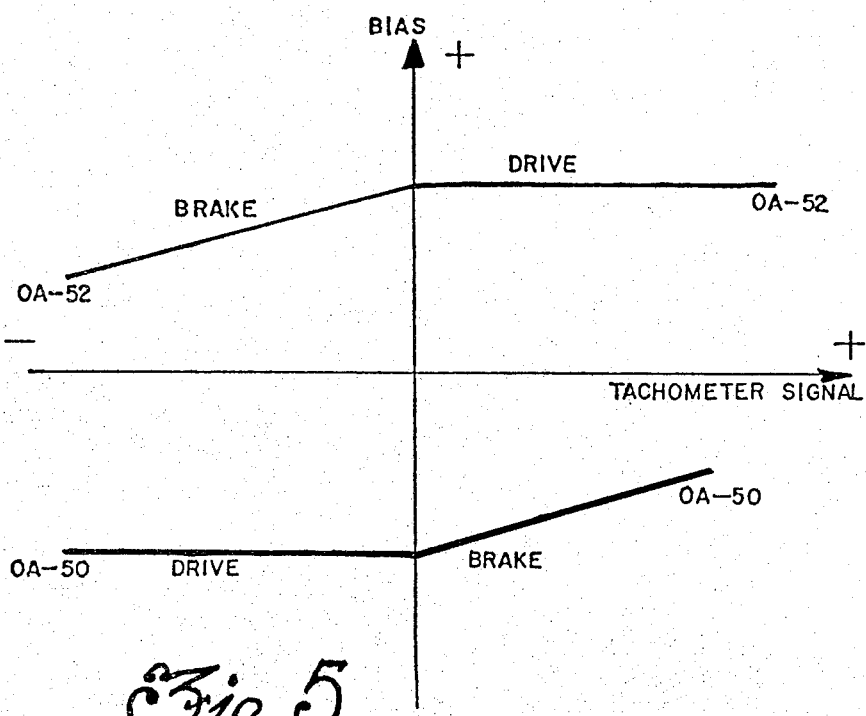
FIG. 5 is an explanatory diagram relating to FIG. 4.

These requirements are met in FIG. 4 by using operational amplifiers 50 and 52 to apply the positive and negative bias voltages to resistors 24 and 34 respectively. The tachometer signal is applied to the noninverting inputs of the amplifiers which are so biased on their inverting inputs that for a positive tachometer signal the output of amplifier 52 remains unchanged whereas the output of amplifiers is reduced as the magnitude of the tachometer signal increases. Conversely, for a negative tachometer signal, the output of amplifier 50 remains unchanged whereas the output of amplifiers 52 is reduced in magnitude as the magnitude of the tachometer signal increases. The outputs of the operational amplifiers 50 and 52 are shown in FIG. 5.

While the invention has been illustrated in some detail according to the preferred embodiments shown in the accompanying drawings, and while the preferred embodiments have been described in some detail, there is no intention to thus limit the invention to such detail. On the contrary, it is intended to cover all modifications, alterations and equivalents falling with the spirit and scope of the appended claims.

What is claimed is:

1. An apparatus for predetermining the maximum current supplied by a drive circuit to a bidirectional DC motor coupled to a tachometer providing a tachometer signal having a magnitude representing the actual motor speed and a polarity representing the actual direction of motor rotation, said drive circuit being controlled by the magnitude and polarity of a bipolar speed error signal generated by a comparator in response to the algebraic difference between the tachometer signal and velocity command signal, said command signal having a magnitude representing the desired motor speed and a polarity representing the desired direction of motor rotation, the apparatus comprising a bipolar limiting means having an input responsive to the tachometer signal and an output connected between the comparator and the drive circuit for limiting the magnitude of the speed error signal to positive and negative limiting levels for both polarities of the tachometer signal, said limiting means causing the magnitude of the limiting level to be (1) varied continuously in accordance with a plurality of linear functions, and in response to the tachometer and command signals having polarities representing the same direction of motor rotation, each linear function controlling over a portion of the full speed range of the motor to produce a nearly exponential profile of motor current, and (2) directly proportional to the tachometer signal in response to the polarity of the tachometer signal representing a direction of motor rotation opposite the direction of motor rotation being represented by the polarity of the command signal, whereby the maximum current available to the motor is predetermined exclusively by the speed error signal over the full speed range of the motor.

2. The apparatus of claim 1 wherein the means for limiting the speed error signal further comprises:
(a) means for increasing the limiting level continuously to produce constant motor current over an initial speed range of the motor;
(b) means for reducing the limiting level continuously to produce rapidly decreasing motor current over an intermediate speed range of the motor; and
(c) means for increasing the limiting level continuously to produce gradually decreasing motor current over a final speed range, the motor current decrease being at a rate less than the rate of decrease over the intermediate motor speed range.

3. The apparatus of claim 2 wherein the means for limiting the speed error signal includes, for each of the positive and negative limiting levels, a respective circuit comprising:
(a) a semiconductor device having a control terminal for controlling the conductivity of a conduction path through the device, said device being connected between a line carrying the speed error signal and a point of reference potential;
(b) means for applying the tachometer signal to the control terminal with a polarity to increase the magnitude of the limiting level established on the speed error signal line as motor speed increases over the initial motor speed range;
(c) a bias circuit also connected to the control terminal; and
(d) a bias control circuit responsive to the tachometer signal for controlling the bias circuit to reduce the bias on the control terminal over the intermediate motor speed range to an extent overcoming the action of the tachometer signal on the control terminal, thereby reducing the magnitude of the limiting level established on the speed error signal line over the intermediate motor speed range.

4. The apparatus of claim 3 wherein the means for limiting the speed error signal further includes means connected to the bias control circuits for preventing further reduction of the bias taking place beyond the intermediate part of the motor speed range whereby in a final motor speed range the limiting level is again increased by an increase in the tachometer signal.

5. The apparatus of claim 4 wherein the preventing means further comprises a controlled current shunt circuit connected to the control terminal of the semiconductor devices and responsive to the tachometer signal, said shunt circuit being conductive during the final motor speed range to cause the rate of increase of the limiting level over the final motor speed range to be less than the rate of increase of the limiting level over the initial motor speed range.

6. The apparatus of claim 5 wherein the means for limiting the speed error signal further comprises a bias potential source connected to each bias circuit for reducing
in proportion to the magnitude of the tachometer signal, the bias potential for the one of the semiconductor devices which is active when the polarities of the tachometer signal and the command signal represent opposite directions of motor rotation.

* * * * *